INVENTORS
JULIAN R. A. BEALE
ANDREW F. BEER
BY
Frank R. Trifari
AGENT

INVENTORS
JULIAN R. A. BEALE
ANDREW F. BEER
BY
Frank R. Trifari
AGENT

INVENTORS
JULIAN R. A. BEALE
ANDREW F. BEER
BY
Frank R. Trifari
AGENT

INVENTORS
JULIAN R. A. BEALE
ANDREW F. BEER
BY
Frank R. Trifari
AGENT

United States Patent Office 3,449,648

Patented June 10, 1969

3,449,648

IGFET WITH INTERDIGITAL SOURCE AND DRAIN AND GATE WITH LIMITED OVERLAP

Julian Robert Anthony Beale, Reigate, and Andrew Francis Beer, Crawley, England, assignors, by mesne assignments to U.S. Philips Corporation, New York, N.Y., a corporation of Delaware Filed Feb. 20, 1967, Ser. No. 617,193
Claims priority, application Great Britain, Feb. 18, 1966, 7,254/66
Int. Cl. H01l *11/14*
U.S. Cl. 317—235 6 Claims

ABSTRACT OF THE DISCLOSURE

An insulated gate field-effect transistor having interdigitated source and drain electrodes with a gate electrode overlying only the interdigitated projections and being spaced from the common electrode regions to provide a transistor exhibiting improved transconductance without increased feedback capacitance.

This invention relates to a field effect transistor of the type having an insulated gate electrode, comprising a monocrystalline semiconductor body of the one type having two spaced surface regions of the other type at one surface of the body and between said regions the channel region with the gate electrode formed over at least part thereof and insulated therefrom and having ohmic contacts at the surface regions and the gate electrode.

In such semiconductor devices the current flow occurs in a region at or near the surface of a semiconductor body and the current flow is modulated by a voltage applied to a gate electrode adjacent to but insulated from the surface of the semiconductor body.

The current flow may occur between two PN junctions, the device being of the so-called "enhancement" form and the current may be initiated by the voltage on the gate electrode in addition to modulation by this voltage. In some devices of the enhancement type current flow occurs already at zero gate voltage and the current may be reduced or increased by application of the appropriate gate voltage.

Figure 1:
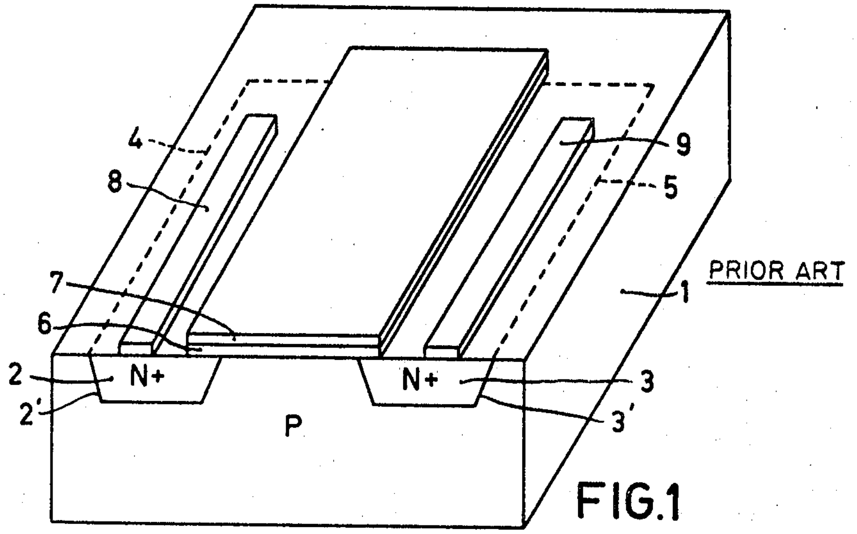

An example of a known field-effect transistor of the enhancement type is illustrated in FIG. 1 which shows a partly perspective view of the device with a vertical section. A monocrystalline P type substrate 1 of silicon has two spaced surface regions 2 and 3 at one surface of the body. These regions may be formed by diffusion of an N type impurity such as phosphorus into the surface of the body. Two rectifying PN junctions 2', 3' are formed between the two surface regions 2, 3 and the substrate 1 with a photoresist technique. These PN junctions are exposed at the surface of the substrate along the chain lines 4, 5. A thin dielectric layer 6 is disposed on the surface of the body between two opposed parts of the junctions 4, 5. This dielectric layer may be of silicon dioxide formed by oxidation of the silicon substrate.

A conductive layer 7 may be formed on the dielectric layer 6 by vacuum deposition techniques during which process the ohmic contacts 8, 9 to the two spaced surface regions 2, 3 may be formed. The conductive layer may consist of aluminium.

A more detailed account of this type of field-effect transistor in regard to its structure and operation is given in Proc. I.E.E.E., September 1963 at page 1190, in an article entitled "The Silicon Insulated Gate Field Effect Transistor" by Hofstein and Heiman.

In operation a voltage is applied between the two surface regions. Current flow between the two surface regions may be initiated and controlled by a voltage applied between the conductive layer and the semiconductor substrate. This voltage is of such polarity that a surface channel of the other conductivity type is induced under the dielectric layer allowing current to flow between the two surface regions. This mode of operation is referred to as the enhancement mode because the conduction channel is formed by application of a voltage to the conductive layer.

This device may be operated in a manner analogous with a vacuum tube. The two surface regions are usually referred to as source and drain regions and the conductive layer as the gate electrode. A modulating signal is applied to the gate electrode which has a high input impedance.

It is necessary for the conductive gate to overlap the surface regions to ensure that, during use, the induced surface channel extends to both regions. This overlapping gives rise to a capacitance between the gate electrode and the drain electrode which can lead to a large degree of feedback at high frequencies. It is therefore necessary for the gate electrode to be accurately in registration with the surface regions to ensure that the overlap is kept to a minimum but that the gate electrode does extend to the surface regions.

The properties of the device are dependent inter alia upon the spacing between the source and drain regions between which the current flows and the length of the channel region through which current flow occurs. In the known device described previously this spacing is usually approximately 10 microns. The *gm* of the device (mutual conductance) can be improved by decreasing this dimension and/or increasing the length of the current carrying channel region.

If the spacing between the source and drain regions is decreased, difficulties are introduced into the manufacture of the device because the gate electrode must be placed in registration with the channel region and have as small an overlap as possible with the drain region. If the channel region had a width of $1\mu$ the gate electrode must have a width of considerably more than $1\mu$ in order to ensure that the gate electrode wholly covers the channel region between the surface regions. It is difficult using present techniques to align the gate electrode to cover the channel region but overlap the drain region only to a small degree.

A field-effect transistor of the depletion type has a configuration similar to that shown in FIG. 1 but with an N-type region extending adjacent the surface between the two N+ surface regions 2, 3. Current flow occurs between the two regions 2, 3 through the N-type surface, region and the current carrying section of this region may be reduced by applying a negative voltage to the gate electrode. The current carrying section of the N type region then lies between the P type substrate and an induced P type region adjacent the layer of insulation on the semiconductor surface.

Further, it is often very important that the channel region between the surface regions, as viewed in a direction transverse to the direction of the current between the surface regions and parallel to the one surface of the semiconductor body, should have a great length while the field-effect transister still being compact and of a simple structure.

An object of the invention is therefore to provide a field-effect transistor of the kind mentioned in the preamble which has a channel region which, as viewed transversely of the direction of the current in the channel region, has a great length while the field-effect transistor still being compact and of a simple structure and further having very good electrical properties, if desired, and a capacitance causing small feedback.

According to the invention a field-effect transistor of the kind mentioned in the preamble is characterized in that the surface regions have interdigital projections causing a meandering channel region, the gate electrode being formed only over the projections of the surface regions and over areas of the channel region which are located therebetween.

The surface regions may be bounded at the surface of the semiconductor body by PN-junctions.

Also a thin surface layer of the other type may extend between and border on the surface regions, said thin surface layer having a higher resistivity than the surface regions.

The gate electrode may simiply be linear.

An important embodiment is characterized in that the surface regions have interdigital projections.

The average width of the projections is preferably at most 10μ. For a larger average width of the projections, the advantages of a geometry according to the invention are proportionally small. If the field-effect transistor is intended for use at high frequencies where the capacitance causing feedback must be low, the average width of the projections is preferably not greater than 5μ.

The invention also relates to a method of manufacturing a field-effect transistor according to the invention, which is characterized in that the meandering oxide layer is formed by using an electron beam technique.

Figure 5:
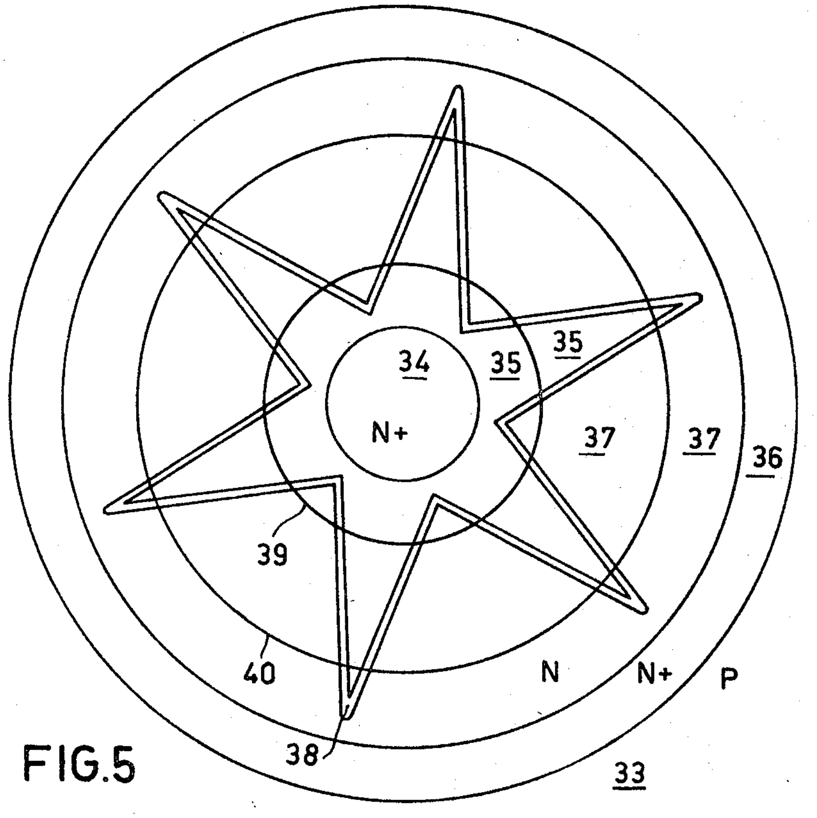
Figure 2:
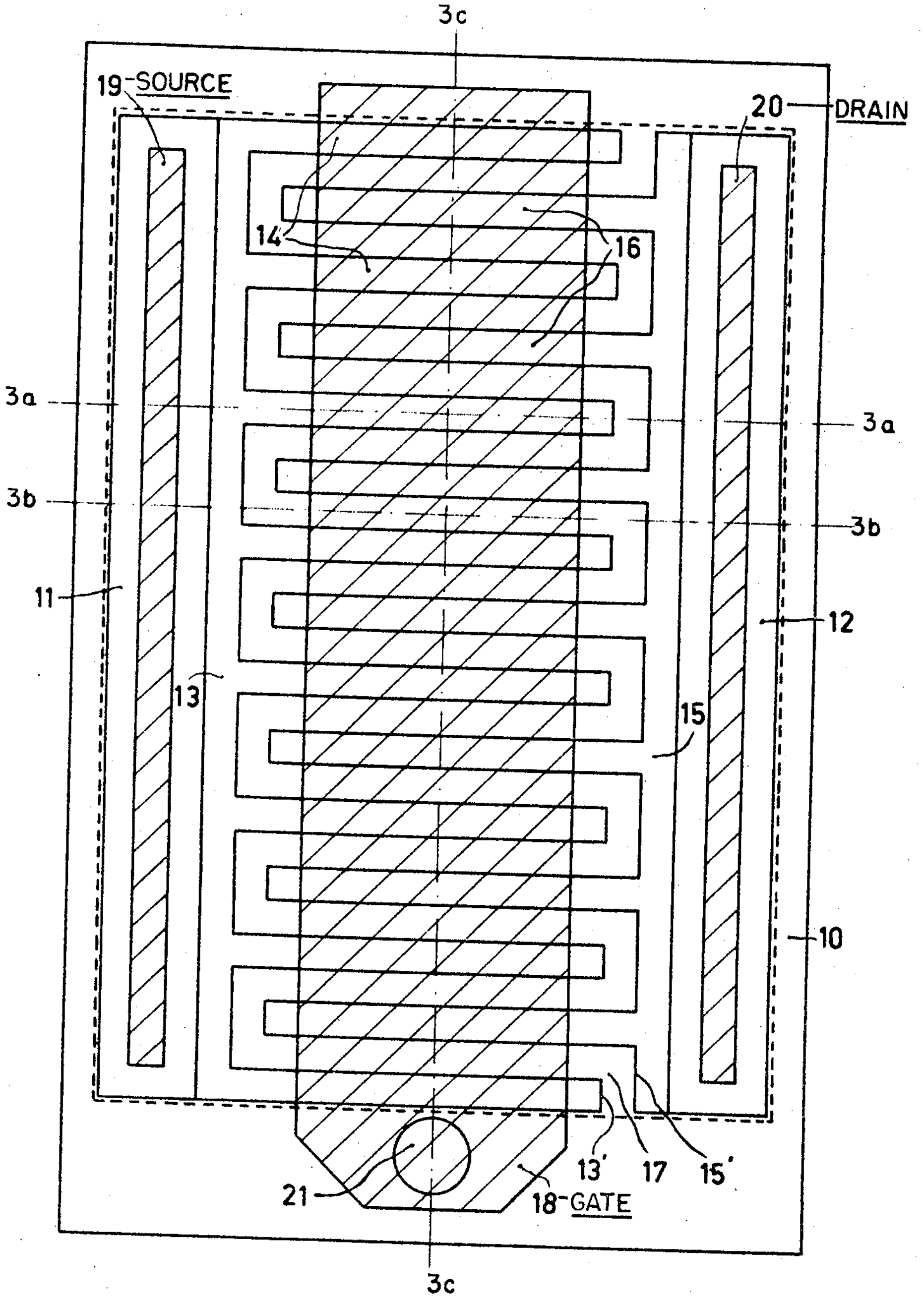
Figure 6:
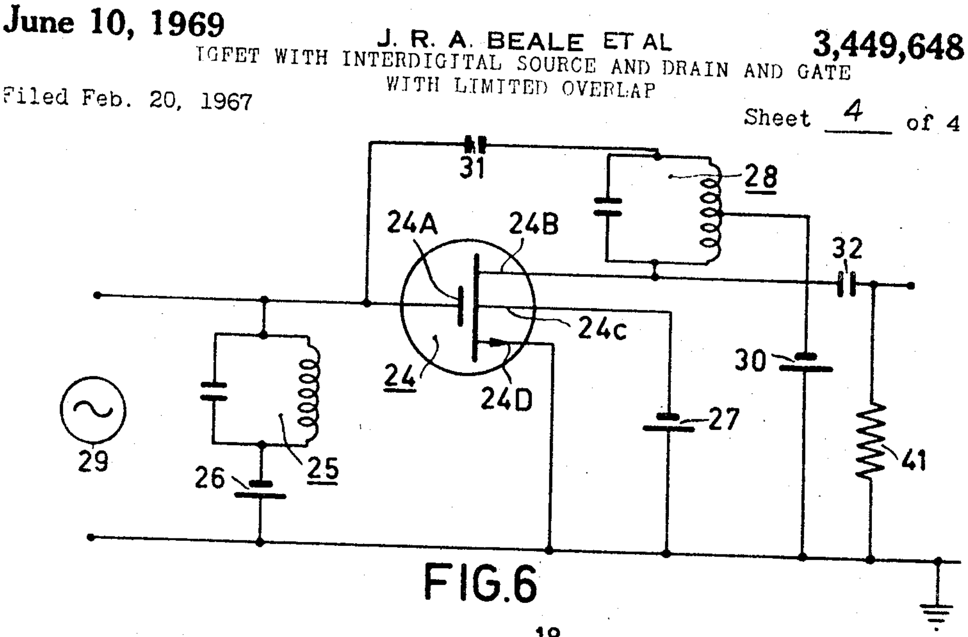

Two embodiments of a field-effect transistor according to the invention will now be described with reference to the accompanying diagrammatic darwings in which FIG. 1 is a cut-away view of a prior art device, FIG. 2 shows a plan view of on a field-effect transistor of the enhancement type of the invention, FIGS. *3a, 3b,* and *3c* show three vertical sections along the lines *3a, 3b* and *3c* respectively in FIG. 2, FIGS. *4a, 4b,* and *4c* show vertical sections of a field-effect transistor of the depletion type of the invention, FIG. 5 shows a plan view of a field-effect transistor with circular geometry of the invention and FIG. 6 shows a circuit in which a device according to the invention may be used.

A monocrystalline boron doped P type silicon, substrate 10 having a resistivity of 5Ω cm. has two surface regions 11, 12 formed by diffusion of phosphorus into a surface using oxide masking, the spacing between the regions 11 and 12 being 50 microns. The two surface regions 11 and 12 adjoin higher resistivity surface regions 13, 15 which have a series of extensions 14, 16 in interdigital relationship. The extensions extend to 7μ from each surface region. The lines 13′, 15′ bound the meandering channel region 17. The width of each of these extensions is approximately 1 micron with a spacing between them of 1 micron. Thus the width of the channel region 17 is 1 micron and its length is considerably more than the length of each of the diffused surface regions. The effective overlap of the gate electrode over the drain region is ½μ.

If the device has a length of 240μ the length of the channel region is approximately 3000μ and thus the device has a channel region having a high ratio of length to width and hence a relatively high *gm* (approximately 10 ma./v. when the drain voltage is 10 v., drain current 10 ma. and gate voltage 30 v.) together with an effective overlap of gate electrode over drain region of ½μ.

It will be noted that the current flow in the enhancement device according to the invention occurs in a direction parallel to the largest dimension of the gate electrode while in the known device configuration the current flow is normal to this dimension.

An aluminium gate electrode 18 having a width of 25μ is disposed over part of the channel region 17 and over the extensions 14 and 16 and is insulated therefrom by a layer of silicon dioxide 22. Ohmic contacts 19, 20 and 21 are made to the source region, drain region and gate electrode, respectively.

In operation current flow from the source to the drain occurs across the channel region between the interdigital projections 14 and 16 in those parts of the channel region which lie under the gate electrode.

Figure 3A:
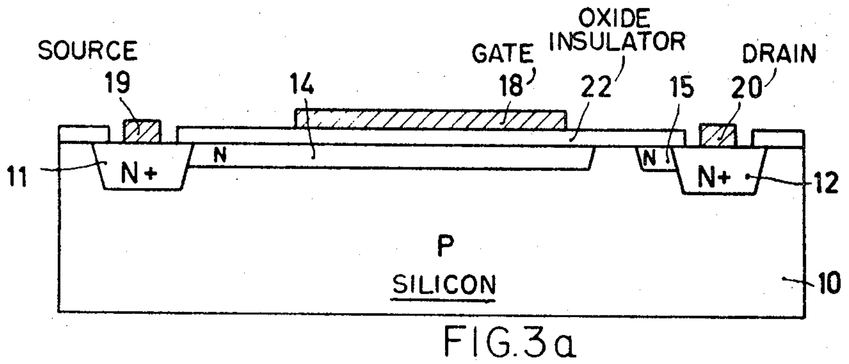
Figure 3B:
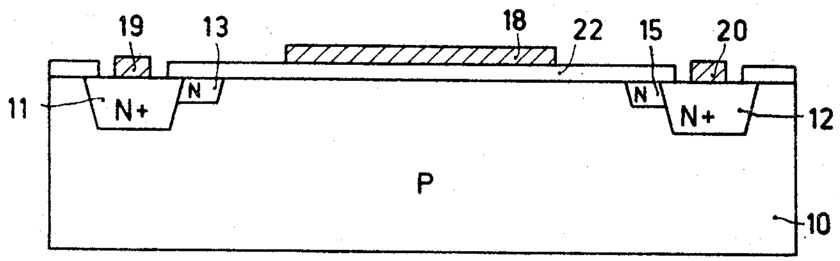
Figure 3C:
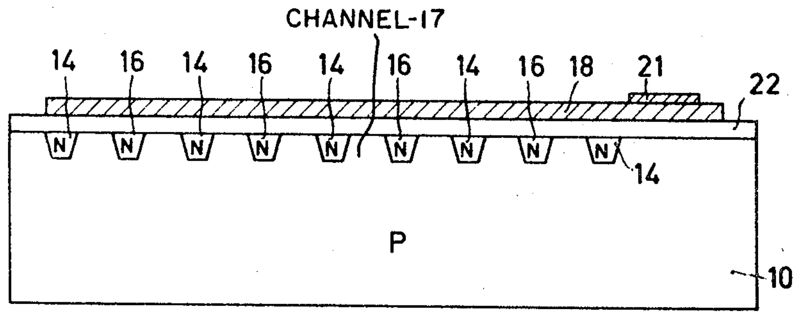
Figure 4A:
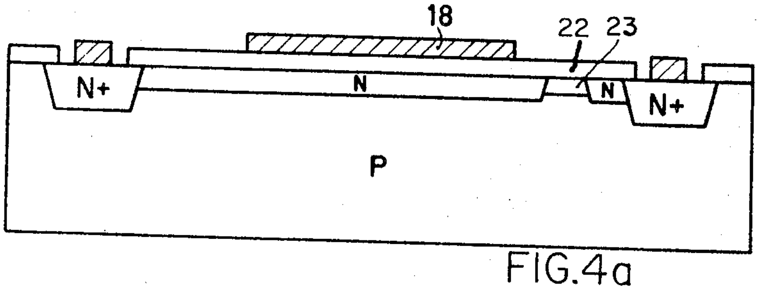
Figure 4B:
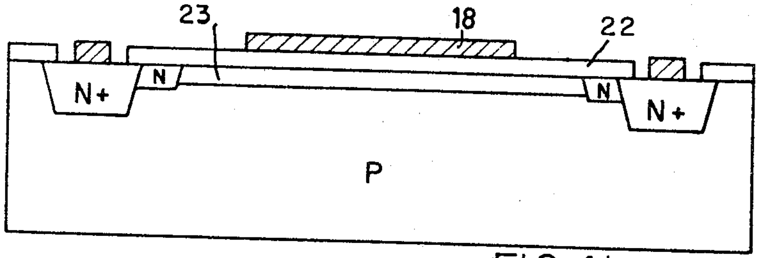
Figure 4C:
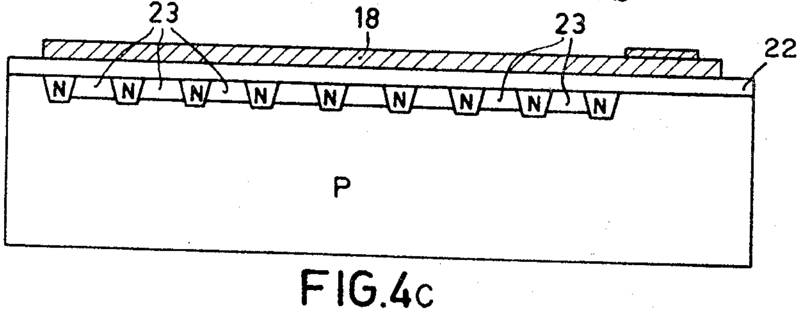

In FIG. 4 are shown sections of a field-effect transistor of the depletion type corresponding to the sections shown in FIG. 3. This device with a similar plan view to the device shown in FIG. 2 has a high-ohmic N-type surface region 23 extending between the interdigitated source and drain regions. When a negative potential is applied to the gate electrode 18 a P-type surface layer is induced in the region 23 and the current carrying channel is limited to a section between the induced P-type surface layer and the P-type substrate.

It will be appreciated that although the current flow will be reduced under the gate electrode the current flow in the parts of the channel which are not covered by the gate electrode will be reduced only to a very small extent by the applied voltage. Thus the *gm* of the device is not very great.

In FIG. 5 is shown a device tof the enhancement type having a circular geometry.

A meandering channel region 38 with a width of 1μ is formed between two N-type surface regions 35, 37. Ohmic contact to the surface regions is made by the N+ regions 34, 36. The regions are formed by the introduction of donor impurities into a P-type substrate 33. The gate electrode is delineated by the lines 39, 40 and it is seen that the gate electrode overlays at least a part of the channel regions 38.

The circular geometry form has a lower series resistance than a device with linear geometry because the extensions have a triangular instead of elongated shape. The device shown in FIG. 5 has, however, a larger gate/drain capacity (the drain electrode being connected to surface region 34) because the extensions overlapped by the gate are triangular.

The device shown in FIG. 5 may also be prepared as a field-effect transistor of the depletion type with a high resistivity N-type layer in the meandering channel region.

In FIG. 6 is shown a circuit in which the device according to the invention may be used. A field-effect transistor 24 of the enhancement type in which current is carried by an N-type induced channel has a timed circuit 25 connected between the gate electrode 24A and earth, a bias battery 26 is also provided. The input signal is from a signal source 29. The source electrode 24D of the device is connected to earth and the substrate 24C of the device is maintained at a certain potential by the battery 27. A timed circuit 28 is placed between the gate electrode 24A and the drain electrode 24B and the voltage between source and drain is provided by battery 30 which is blocked from the gate electrode by capacitor 31 and from the signal by capacitor 32. The amplified output signal is derived across the load 41.

A method of preparing the device shown in FIGS. 2 and 3 will now be described:

A P-type monocrystalline silicon body 10 had one plane surface oxidised using known techniques to give a layer of silicon dioxide with a thickness of 0.3μ.

Windows were etched in the oxide layer in the usual manner for forming the regions 11 and 12.

Phosphorus diffusion was made through the windows to form the N+ regions 11, 12 in the body 10. The N+ regions were spaced apart by a distance of 50μ and had a phosphorus concentration of approximately $5\times10^{20}$ atom./ccm. The oxide layer was then removed from the surface area located inside the chain lines in FIG. 2 using a solution of ammonium fluoride in hydrofluoric acid.

A meandering oxide layer having a thickness of 0.3μ and a width of 1μ was deposited on the area corresponding to the channel region 17. Deposition of the oxide was made using electron beam techniques. The electron beam was focussed onto the silicon substrate which had been placed in an atmosphere of oxygen containing tetraethoxysilane. The current density was approximately 1 ma./cm.$^2$ with a voltage of 10 kv. The partial pressures of the oxygen and silane were about $10^{-2}$ mm. of mercury. After deposition of the oxide layer, heating was carried out in wet argon for ½ hour at 700° C.

Arsenic diffusion was then made into the areas still exposed to give two N-type surface regions 13, 15 having projections 14, 16. The concentration of impurity introduced into the substrate in this diffusion process is lower and less deep than in the previous diffusion process to ensure that the parts 14 and 16 remain separate under the oxide layer.

The meandering oxide layer was removed with a solution of ammonium fluoride in hydrofluoric acid and another oxide layer grown over the whole surface of the substrate. Windows were opened in the oxide layer at the positions where the contacts 19, 20 were required. The arsenic diffusion profiles will in practice not be affected if oxidation is carried out below 1000° C.

Aluminum was deposited to a depth of 0.1$\mu$ to form the ohmic contacts 19, 20 and the gate electrode 18. The gate electrode must be positioned approximately symmetrically between the source and drain regions over the meandering channel region 17 but a certain degree of misregistration of the gate relative to the source and drain regions is allowed which will substantially not alter the device properties.

Ohmic contact 21 was made to the gate electrode and lead wires were connected to the contacts 19, 20 respectively whereafter the mounting of the device was completed.

The N-type surface region 23 may be formed by a diffusion step using a donor impurity prior to the formation of the meandering oxide layer. Further, the formation of an oxide layer on a silicon surface may increase the donor concentration at that surface and an N-type region may be formed dependent on the resistivity of the P-type substrate and the oxidising conditions.

The device according to the invention has improved characteristics and a relatively small gate/drain capacitance. A further advantage of a device according to the invention is the relatively long channel region across which current flow occurs, in a compact form which is of particular advantage in the manufacture of integrated circuits. Thus the semiconductor substrate may carry other active and passive components which form a circuit with the device according to the invention. A very important point is that the gate electrode need no longer be centred very accurately.

What is claimed is:

1. An insulated gate field-effect transistor comprising a monocrystalline semiconductor body of one type conductivity having a surface and two spaced regions along said surface of the opposite type conductivity forming source and drain electrodes and a channel region along the said surface therebetween, each of said source and drain electrodes comprising a common surface region of the body and spaced surface projections extending along the surface from the common region toward the other electrode up to the vicinity of its common region, the surface projections of the source and drain electrodes being interdigitally arranged with one another to form a channel region that meanders between the source and drain common regions, an insulating layer on said surface, a gate electrode on the insulating layer, said gate electrode overlying the surface projections of both the source and drain electrodes and the meandering channel region in between but being laterally spaced from the source and drain common regions, and ohmic connections to the gate electrode and the source and drain common regions, whereby the transistor exhibits improved transconductance without a corresponding increase in feedback capacitance.

2. A transistor as set forth in claim 1 wherein the average width of the projections, measured in the longitudinal direction of the common regions, is between 5 and 10 microns.

3. An insulated gate field-effect transistor comprising a monocrystalline semiconductor body of one type conductivity having a planar surface and two spaced regions along said surface of the opposite type conductivity forming source and drain electrodes and a channel region along the said surface therebetween, each of said source and drain electrodes comprising an elongated common surface region of the body and spaced surface projections extending from the common region toward the other electrode up to the vicinity of its common region, the surface projections of the source and drain electrodes being interdigitally arranged with one another to form a channel region that meanders between the source and drain common regions, an insulating layer on said planar surface, a gate electrode on the insulating layer and extending generally parallel to the common regions, said gate electrode overlying the surface projections of both the source and drain electrodes and only a part of the meandering channel region inbetween and being laterally spaced from the source and drain common regions, and ohmic connections to the gate electrode and the source and drain common regions, whereby the transistor exhibits improved transconductance without a corresponding increase in feedback capacitance.

4. A transistor as set forth in claim 3 wherein the common regions have a higher conductance than the projections.

5. A transistor as set forth in claim 4 wherein the source and drain common regions extend generally parallel to one another, and the gate electrode is linear and extends generally parallel to the common regions.

6. A transistor as set forth in claim 4 wherein the source and drain common regions are circular and concentric with one another, and the gate electrode is also concentric with the common regions.

References Cited

UNITED STATES PATENTS

| | | | |
|---|---|---|---|
| 3,094,633 | 6/1963 | Harries | 307—88.5 |
| 3,097,308 | 7/1963 | Wallmark | 307—88.5 |
| 3,121,177 | 2/1964 | Davis | 307—88.5 |
| 3,258,663 | 6/1966 | Weimer | 317—235 |
| 3,303,400 | 2/1967 | Allison | 317—235 |
| 3,309,585 | 3/1967 | Forrest | 317—234 |
| 3,354,354 | 11/1967 | Amick | 317—235 |

JOHN W. HUCKERT, *Primary Examiner.*

S. BRODER, *Assistant Examiner.*

U.S. Cl. X.R.

317—234, 240